J. ANDERSON.
LUBRICATING OIL HEATER.
APPLICATION FILED APR. 11, 1917.
1,294,022.
Patented Feb. 11, 1919.
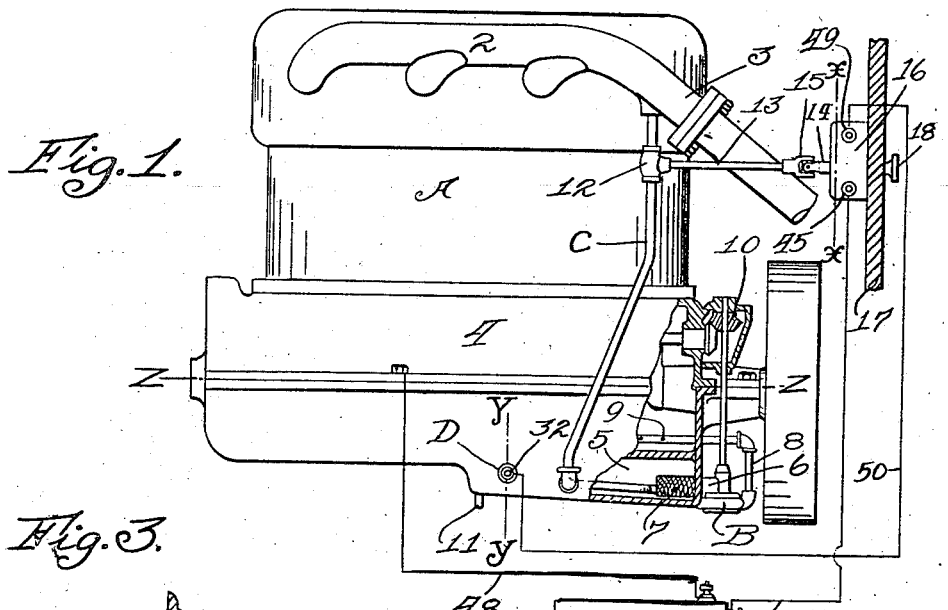
Fig. 1.
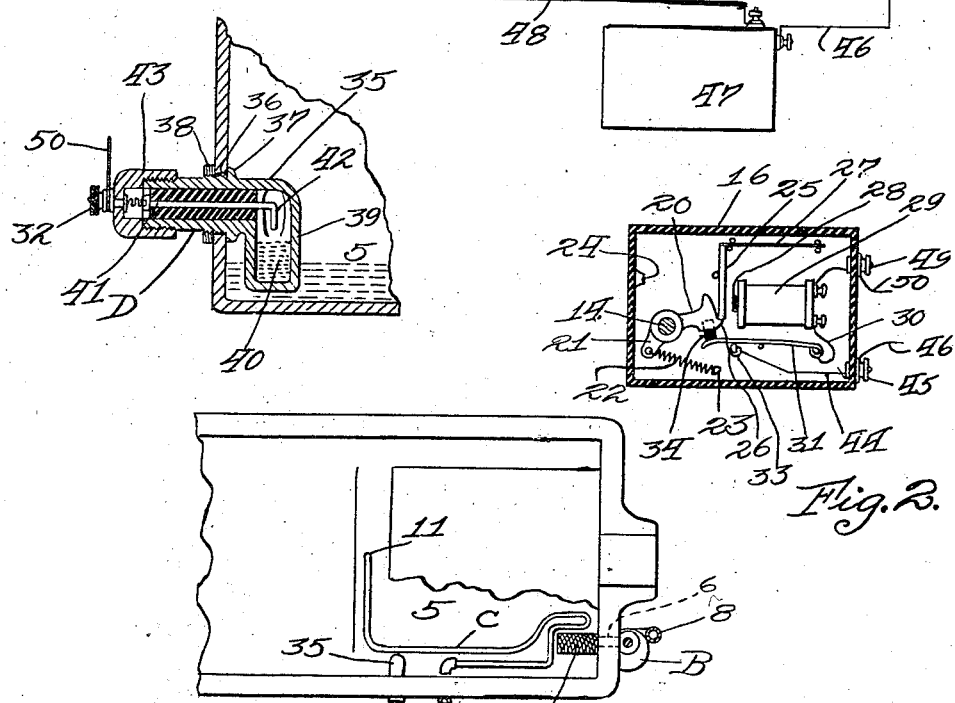
Fig. 3.
Fig. 2.
Fig. 4.
Inventor:
Josiah Anderson.
by: J. Bradbury
Attorney.

UNITED STATES PATENT OFFICE.

JOSIAH ANDERSON, OF MINNEAPOLIS, MINNESOTA.

LUBRICATING-OIL HEATER.

1,294,022.   Specification of Letters Patent.   Patented Feb. 11, 1919.

Application filed April 11, 1917. Serial No. 161,382.

*To all whom it may concern:*

Be it known that I, JOSIAH ANDERSON, a citizen of the United States, residing at Minneapolis, in the county of Hennepin and State of Minnesota, have invented a new and useful Improvement in Lubricating-Oil Heaters, of which the following is a specification.

This invention relates to lubricating oil heaters for internal combustion engines, and has for its primary object the provision of means for heating the oil when it becomes stiff or hard, due to low temperature. In summer time when the temperature is warm, little or no difficulty is experienced in lubricating internal combustion engines with the usual lubricating oil that is employed, but when the temperature lowers as in winter time, the oil which is usually employed becomes stiff and solid, which results in ineffective lubrication of the engine from the oil, which is usually employed in the crank case for that purpose and the bearings and running parts of the engine in consequence soon become worn, necessitating replacing which is expensive. My invention is designed to overcome these objections in a simple and effective manner.

With these and other objects in view which will be apparent from the following description, my invention comprises the features of construction and combination of parts hereinafter more particularly described and claimed.

In the drawing, Figure 1 is a side elevation partly in section of an internal combustion engine showing my improvement applied thereto; Fig. 2 is a section of a detail taken on the line X—X of Fig. 1; Fig. 3 is an enlarged section of a detail taken on the line Y—Y of Fig. 1, and Fig. 4 is another section of a detail taken on the line Z—Z of Fig. 1.

In the drawing A indicates an ordinary four cylinder internal combustion engine to which my invention is shown applied, it being understood that the engine A is merely shown for illustration and it being further understood that it is contemplated that my invention may be applied to any type of internal combustion engine. The engine illustrated has the usual exhaust manifold 2 through which the exhaust or spent gases from the engine pass through the duct 3 to the muffler not illustrated, or outer atmosphere. The engine A also has the usual crank case 4 in the lower portion of which is the usual lubricating oil chamber or reservoir 5. Lubricating oil which is placed in the reservoir 5 in the usual manner to be used for lubricating the pistons in the cylinders of the engine and the bearings of the crank shaft and crank arms is circulated and fed into the crank chamber and upon the bearings by means of the usual oil feed pump B having the usual inlet duct 6 protected by the screen strainer 7 in the oil reservoir chamber and the usual force feed pipe 8 leading into the crank case and provided with perforations 9 through which the oil is projected by the force exerted by the pump. The force feed pump B is driven in the usual manner by the driving mechanism 10, which receives initial motion from the cam or crank shafts of the engine by the usual mechanism not illustrated.

The mechanism described is effective during warm temperature for lubricating the parts of the engine, but when the temperature lowers as in winter time, the oil in the reservoir becomes stiff or solidified so that the engine will not become properly lubricated until there is sufficient heat generated by the engine to melt the oil. During this period, the bearings often become overheated and damaged to the extent of having to be replaced which is very expensive. This objection is overcome by my improvement, which consists in connecting the pipe or duct C of comparatively small diameter with the exhaust duct 3 and running said pipe through and into the lubricating oil reservoir 5 in close proximity with the strainer 7 or duct 6 and out through the central lower portion of the oil chamber at 11 to the outer atmosphere. In this manner, part of the exhaust from the engine is conducted by a by-passageway to the outer atmosphere after the heat therefrom has been utilized for melting or liquefying the lubricating oil. The passage C is controlled by means of a suitable valve 12, which may be a butterfly valve operated by a valve stem 13, which is connected to the end of a shaft 14 by means of a universal joint 15. The shaft 14 is mounted upon the shell of a casing 16, which in turn is secured to the dash or foot board or any other suitable support indicated by 17 of the vehicle, one end of said shaft being provided with a button or handle 18, by which the shaft can be turned by hand to open the valve 12.

To automatically close the valve 12 after the oil in the reservoir has become thoroughly liquefied by the heat from the exhaust of the engine and so that continued heat from the exhaust will not overheat the lubricating oil, the valve 12 is automatically closed by means of an electrical releasing device comprising a trigger 20 mounted upon the shaft 14 and having an arm 21 to which the helical spring 22 is secured. This spring is fastened to a post 23 and is of sufficient strength to turn the shaft and close the valve, said trigger being drawn against the stop 24 on the side of the shell of the casing 16 and thus limiting the opening of the valve. The trigger is held in the open position of the valve by means of an armature 25 below which the shoulder 26 on the trigger engages, said armature being held in shoulder engaging position by means of the leaf spring 27 upon which the armature is mounted, said spring being secured to the casing 16. The armature is drawn out of engagement with the trigger to release the latter into valve closing position by means of the electrical magnet 28, said magnet being mounted in the casing or receptacle and energized by the coil 29, one end 30 of which is connected to the end of a spring switch arm 31 and the other end with the binding post 49 leading to the terminal 32 of a thermostat D, said thermostat being arranged in the lubricating oil reservoir 5 to be influenced in operation by the temperature of the oil therein. The spring switch 31 is adapted to make and break circuit with a terminal 33 mounted upon and insulated from the shell of the receptacle 16. The free end of the switch arm 31 is provided with a contact block 34 of insulating material which is arranged so that the trigger 20 when the shaft 14 is turned into valve opening position and into engagement with its shoulder 26 below the end of the armature 25 to press the switch arm 31 into contact with the terminal 33, but immediately upon the trigger 20 being released when the magnet 28 is energized and the armature 25 drawn from engagement with the trigger 20, the spring switch arm 31 moves out of contact with the terminal 33, thus automatically breaking the electric circuit.

The thermostat D may be of any suitable construction, that illustrated being what is usually termed of mercurial type. As illustrated, it consists of a tube 35 extending horizontally through an opening 36 in the side of the reservoir 5 and secured thereto by means of a shoulder 37 and a nut 38, the latter being threaded on said tube. The inner end of the tube extends downwardly to form a cup 39, in which a small quantity of mercury 40 is held. The lower end of the cup 39 dips into the oil contained in the reservoir so as to become heated thereby. Mounted in the horizontal portion of the tube 35 and insulated therefrom is a conductor 41, the inner end of which is bent downwardly to form an electrical terminal 42, with which the mercury in the cup 39 is adapted to come into contact when the mercury expands due to the rise of temperature of the oil as when the oil is in liquid condition under normal temperature. When however, the temperature is sufficiently low to render the oil stiff or solid, the mercury contracts sufficiently to break the circuit with the terminal 42. The conductor 41 upon which the terminal 42 is formed is connected to the binding post 32, the latter being insulated from the tube 35 and mounted upon a removable cap 43, which is threaded upon said tube. The contact terminal 33 with which the switch arm 31 co-acts is connected by a wire 44 with the binding post 45 on the receptacle 16 and said binding post is connected by the conductor 46 with one terminal of a battery 47. The other terminal of said battery is connected by the conductor 48 with the crank case of the internal combustion engine. The opposite end of the coil 29 to that which is connected with the switch arm 31 is connected with a binding post 49 on the receptacle 16 and said binding post is connected by the conductor 50 with the binding post 32 on the thermostat D.

The temperature at which the oil will cause the circuit breaker to effect the closing of the valve can be regulated by turning the terminal shaft 41 in its insulating support by means of a screw driver or other means so as to increase or decrease the distance or space between the surface of the mercury and the extremity of the terminal 42.

*Operation.*

When it is desired to use the lubricating oil heater, as when the outside temperature is cold and there is danger of the lubricating oil being in stiff or solid condition, the shaft 14 is turned by the button 18 into the position illustrated in Fig. 2 whereupon the armature 25 engages the shoulder 26 and holds the trigger with the valve 12 in open position, so that part of the exhaust gases from the engine when the latter is started will immediately and continually pass through the duct C and circulate through the oil reservoir 5, thus heating the oil and freely liquefying the same, so that it will readily flow through the pump B and be circulated through the crank case upon the moving parts of the engine. While the oil is becoming liquefied and until its temperature rises to normal condition, the switch arm 31 remains in closed position, being held in that position by the trigger 20, thus closing the circuit passing through the switch arm 31 and the switch arm contact 33 and until the temperature rises sufficiently to expand the mercury 40 in the cup 39, the circuit remains uncompleted and no current passes from the battery, but immediately upon the mercury expanding sufficiently, due to the rise of temperature of the oil to contact with the terminal 42, current passes from the battery through the energizing coil 29 of the magnet 28 and the armature 25 is drawn from engagement with the trigger and the latter is released being drawn by the spring 22 until the shaft 14 closes the valve fully. In this condition the engine will continue to operate without the heater effecting the condition of the oil until it is desired to again open the valve by turning the button 18.

The construction described provides a simple and effective means for heating the lubricating oil when it becomes stiff and solid, and which will automatically check the heating when the oil reaches normal or freely lubricating condition.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to protect by Letters Patent is:

1. In combination with an internal combustion engine having an exhaust outlet for spent gases, a crank case, a lubricating oil chamber therein and means for circulating lubricating oil between said chamber and the bearings of said engine, a duct arranged to be heated by said spent gases passing through the lubricating oil in said chamber to heat said oil therein and thermostatically controlled means for checking the operation of said lubricating oil heating means when the temperature of the oil is raised sufficiently to render the oil in free circulating condition.

2. In combination with an internal combustion engine having an exhaust outlet for spent gases, a crank case, a lubricating oil chamber therein and means for circulating said oil between said chamber and the bearings of said engine, a duct connected with said exhaust outlet leading through said oil chamber and exhausting to the outside for raising the temperature of said oil, a valve in said duct and means for opening and closing said valve.

3. In combination with an internal combustion engine having an exhaust outlet for spent gases, a crank case, a lubricating oil chamber therein and means for circulating lubricating oil between said chamber and the bearings of said engine, a duct connected with said exhaust passage leading through said oil chamber and exhausting to the outside for raising the temperature of said oil, a valve in said duct, a thermostat influenced by the temperature of the lubricating oil in said chamber and means controlled by said thermostat for closing said valve when the temperature of the oil in said chamber is raised to that of freely circulating condition of the oil.

4. In combination with an internal combustion engine having an exhaust outlet for spent gases, a crank case, a lubricating oil chamber therein and means having a port connected with said chamber for circulating lubricating oil between said chamber and the bearings of said engine, means arranged in close proximity to said port in said chamber and connected with said exhaust outlet for raising the temperature of the lubricating oil in said chamber by the heat generated by said spent gases.

5. In combination with an internal combustion engine having an exhaust outlet for spent gases, a crank case, a lubricating oil chamber therein and means for circulating lubricating oil between said chamber and the bearings of said engine, a duct connected with said exhaust outlet leading through said oil chamber and exhausting to the outside for raising the temperature of said lubricating oil, a valve in said duct, a thermostat influenced by the temperature of the oil in said chamber, and electrical means controlled by said thermostat for automatically closing said valve when the temperature of said oil is that of freely circulating liquid condition.

6. In combination with an internal combustion engine having an exhaust outlet for spent gases, a crank case, a lubricating oil chamber therein and means for circulating lubricating oil between said chamber and the bearings of said engine, a duct connected with said exhaust outlet leading through said oil chamber and exhausting to the outside for raising the temperature of said lubricating oil, a valve in said duct, a thermostat influenced by the temperature of the oil in said chamber, means for adjusting the thermostat to regulate the temperature of the oil at which said valve will close, and electrical means controlled by said thermostat for automatically closing said valve when the temperature of said oil is that of freely circulating liquid condition.

In testimony whereof, I have signed my name to this specification.

JOSIAH ANDERSON.